Oct. 19, 1954 W. S. CAMPBELL 2,692,041

BELT CONVEYER DRIVE

Filed Aug. 18, 1950 9 Sheets-Sheet 1

INVENTOR
William S. Campbell

BY L. Donald Myers
ATTORNEY

INVENTOR
William S. Campbell
BY L. Donald Myers
ATTORNEY

Oct. 19, 1954 W. S. CAMPBELL 2,692,041

BELT CONVEYER DRIVE

Filed Aug. 18, 1950 9 Sheets-Sheet 3

INVENTOR
William S. Campbell

BY L. Donald Myers
ATTORNEY

INVENTOR
William S. Campbell
BY L. Donald Myers
ATTORNEY

Oct. 19, 1954

W. S. CAMPBELL 2,692,041

BELT CONVEYER DRIVE

Filed Aug. 18, 1950

9 Sheets-Sheet 5

INVENTOR

William S. Campbell

BY L. Donald Myers

ATTORNEY

Oct. 19, 1954 W. S. CAMPBELL 2,692,041

BELT CONVEYER DRIVE

Filed Aug. 18, 1950 9 Sheets-Sheet 6

INVENTOR

William S. Campbell

BY L. Donald Myers

ATTORNEY

Oct. 19, 1954 W. S. CAMPBELL 2,692,041

BELT CONVEYER DRIVE

Filed Aug. 18, 1950 9 Sheets-Sheet 7

INVENTOR

William S. Campbell

BY L. Donald Myers

ATTORNEY

INVENTOR
William S. Campbell
BY L. Donald Myers
ATTORNEY

Oct. 19, 1954 W. S. CAMPBELL 2,692,041

BELT CONVEYER DRIVE

Filed Aug. 18, 1950 9 Sheets-Sheet 9

INVENTOR

William S. Campbell

BY L. Donald Myers

ATTORNEY

Patented Oct. 19, 1954

2,692,041

UNITED STATES PATENT OFFICE 2,692,041

BELT CONVEYER DRIVE

William S. Campbell, Glenside, Pa., assignor to Link-Belt Company, a corporation of Illinois Application August 18, 1950, Serial No. 180,224

20 Claims. (Cl. 198—203)

Figure 1:
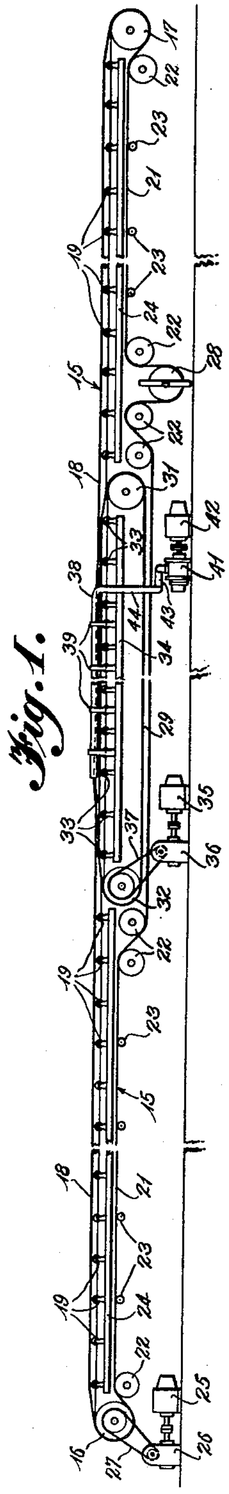

This invention relates to new and useful improvements in belt conveyor drives, and deals more specifically with booster drives employed to supplement the present-day, commercially approved pulley arrangements for driving belt conveyors.

The demands for single belt conveyors that are capable of transporting flowable solids over greater and greater distances have been increasing in number at a relatively rapid rate during recent years. It has been possible to only partially satisfy such demands because the only practical and efficient way that long belt conveyors can be driven is by employing one or more booster drives which are capable of applying power to the active run of the belt, without in any way interrupting the transportation of material by such run, and no commercially practical booster drive, which will meet the above requirements, has been made available so far to the belt conveyor industry.

One primary object of this invention is to provide a drive arrangement for belt conveyors which involves a terminal drive pulley, over which the belt is trained, and a booster drive, engageable with a non-load carrying surface of the belt, for supplementing the power applying action of the said terminal drive pulley.

Another primary object of the invention is the provision of a belt conveyor drive comprising a drive member positioned to have power applying, frictional engagement with a non-load carrying surface of the conveyor belt and means for increasing the power applying action of the engaging surfaces of said drive member and conveyor belt above its normal value.

A further important object of the invention is to provide a belt conveyor booster drive comprising a supplemental drive belt having power applying frictional engagement with two separate, non-load carrying surfaces of the conveyor belt and means for increasing the power applying action of at least one of said pairs of engaging surfaces of said drive and conveyor belts above its normal value.

Another object of the invention is the provision of a booster drive for belt conveyors which comprises a supplemental drive belt positioned to have power applying frictional engagement with a substantial area of at least one non-load carrying surface of a conveyor belt and means for exhausting air from between the engaging surfaces of the two belts to increase above its normal value the power applying action of said surfaces.

More specific objects of the invention are to provide a belt conveyor booster drive comprising a supplemental drive belt positioned to have power applying frictional engagement with a substantial length of at least one non-load carrying surface of a conveyor belt, exhausting air from between the engaging surfaces of the two belts by means of one or more nozzles connected to an exhauster pump and inserted between the superimposed edges of the engaged portions of the belts, and forming transverse depressions in the engaging surface of the drive belt to enable the nozzles to more readily exhaust air from between substantially the entire width of the engaging surfaces of the two belts.

Other objects and advantages of the invention will be apparent during the course of the following description.

Figure 2:
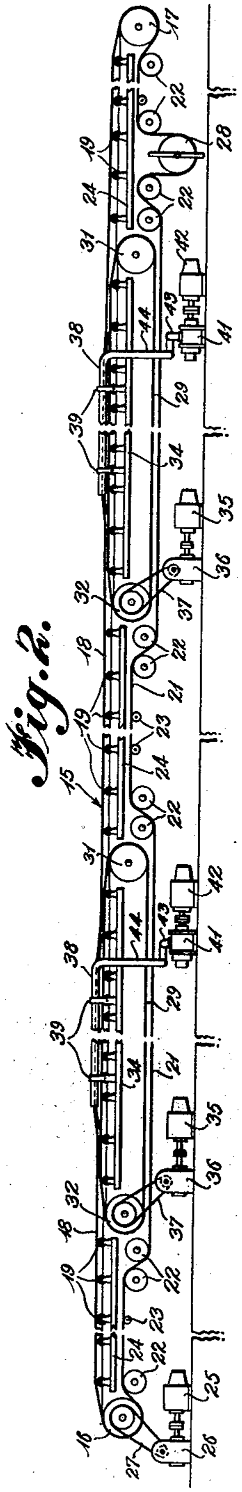
Figure 3:
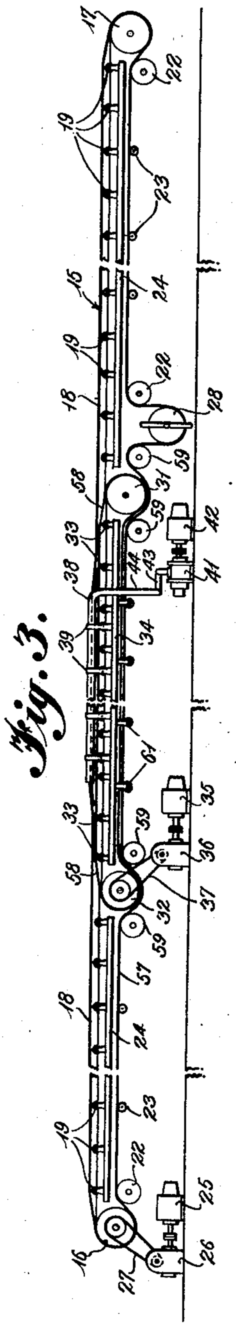
Figure 4:
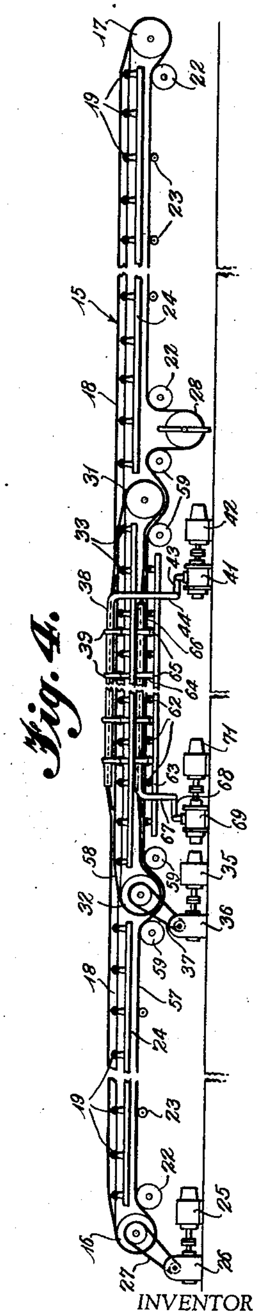
Figure 5A:
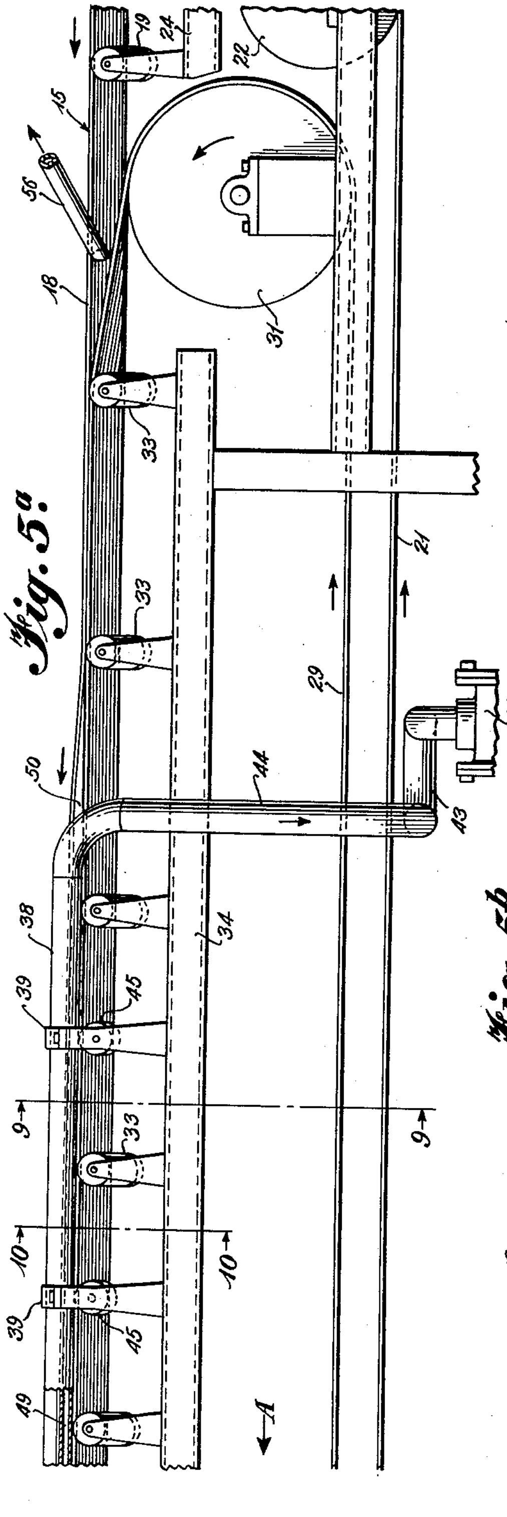
Figure 5B:
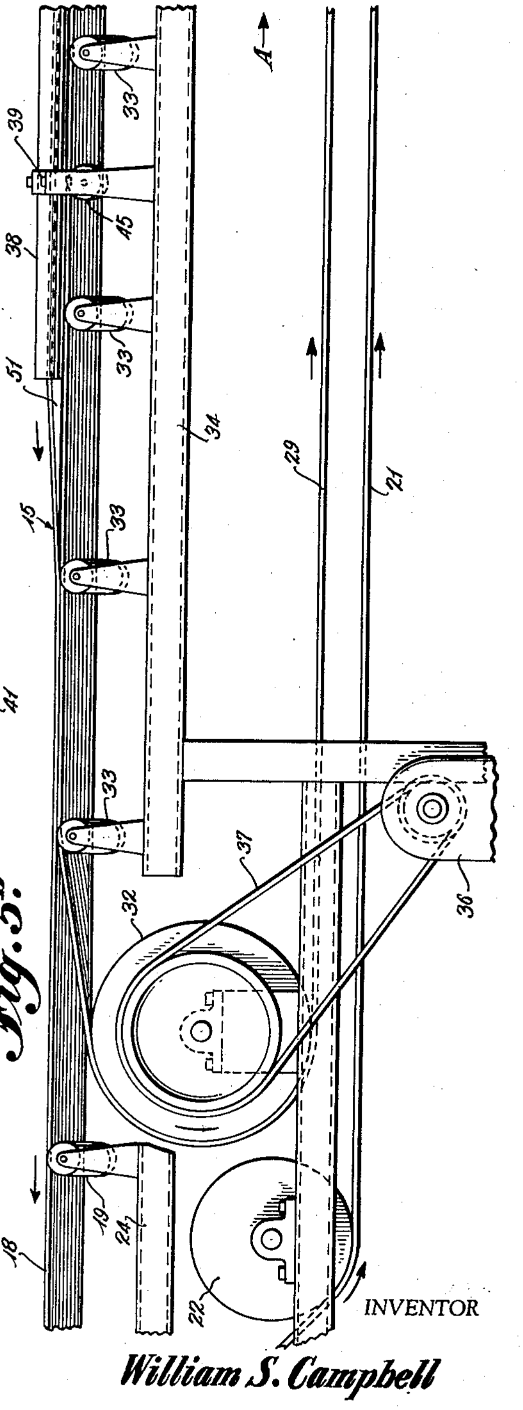
Figure 6A:
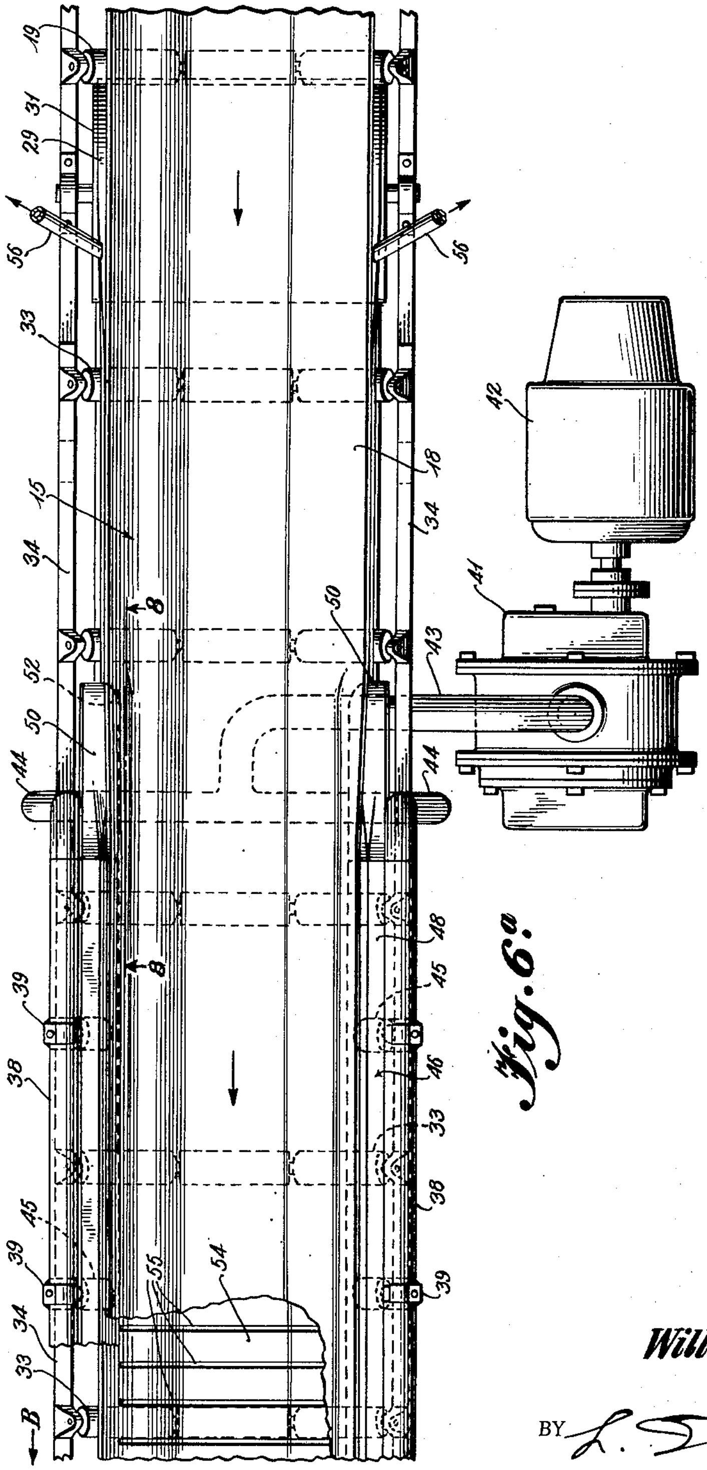
Figure 8:
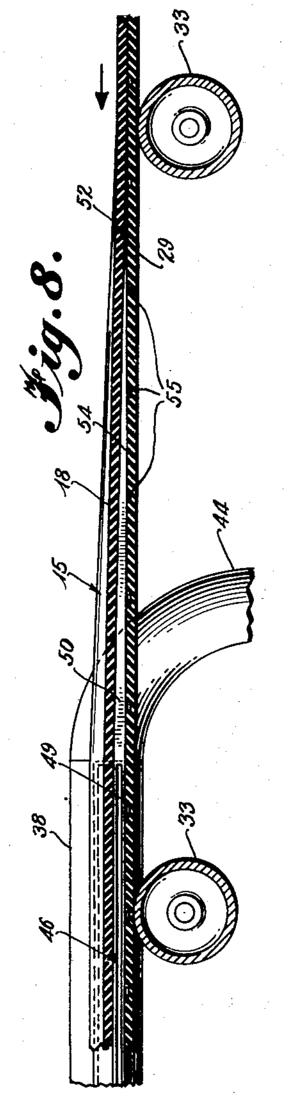
Figure 6B:
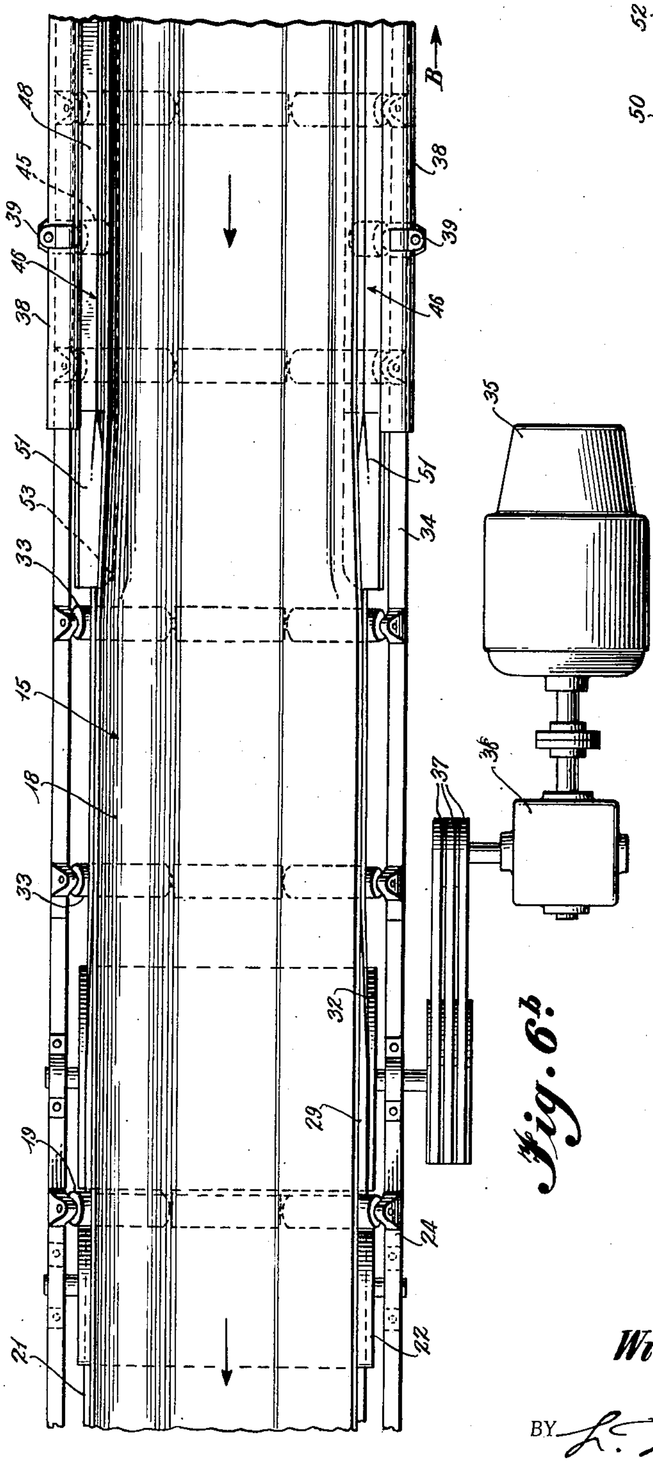
Figure 7:
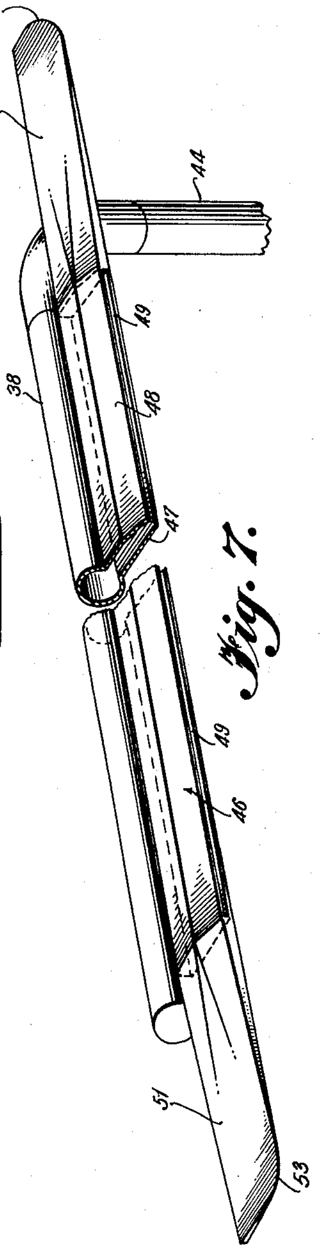
Figure 9:
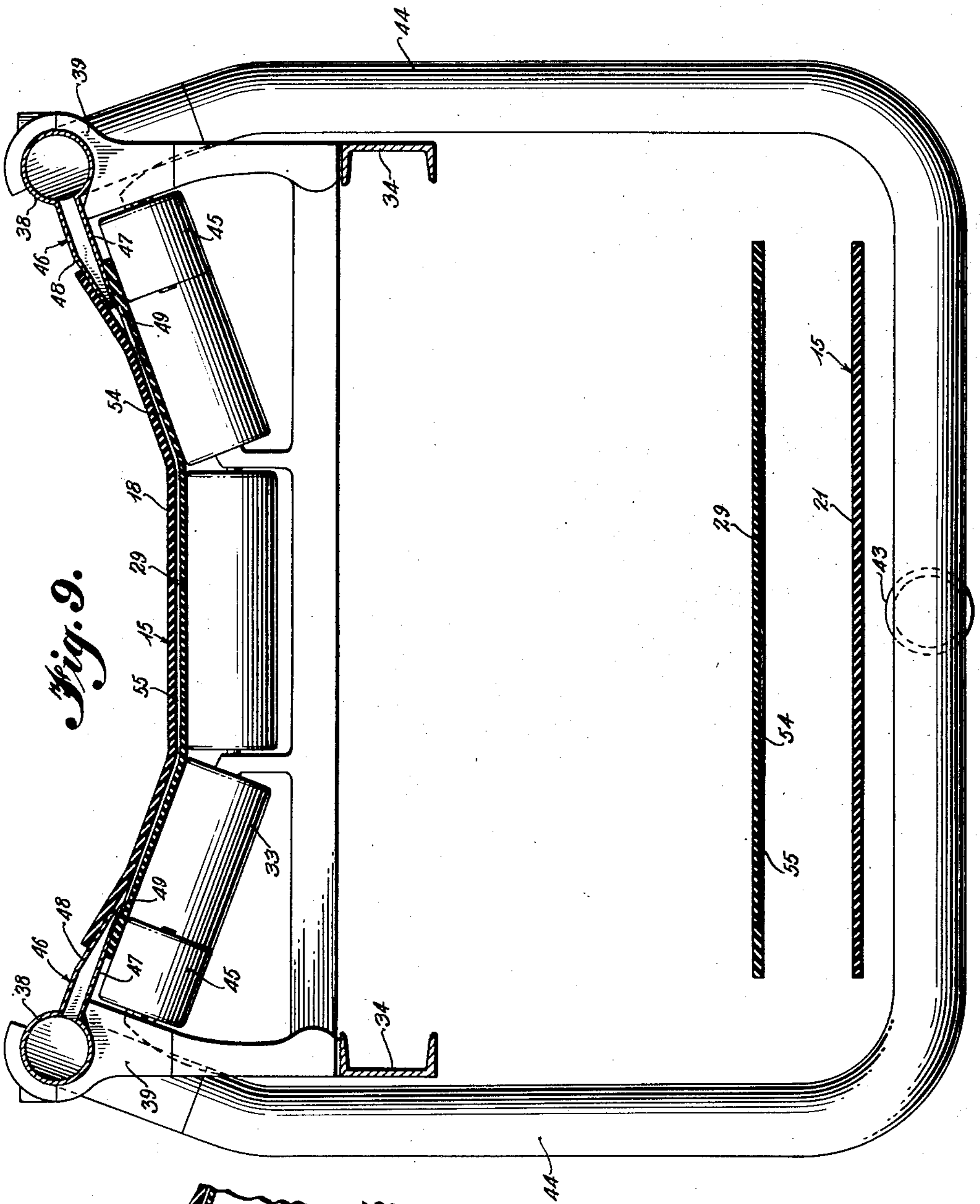
Figure 10:
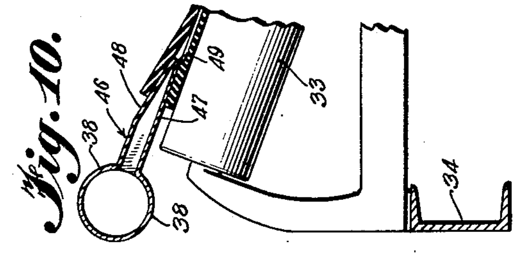

In the accompanying drawings forming a part of this specification and in which like reference characters are employed to designate like parts throughout the same, Figure 1 is a diagrammatic view of a belt conveyor in which the active run is driven by a booster drive of the type embodying this invention, Figure 2 is a diagrammatic view of a belt conveyor illustrating the use of a plurality of booster drives of the type shown in Fig. 1, Figure 3 is a diagrammatic view of a belt conveyor driven by a modified form of the booster drive illustrated in Fig. 1, Figure 4 is a diagrammatic view of a belt conveyor in which both the active and return runs are driven by a further modified form of booster drive embodying this invention, Figures 5*a* and 5*b* collectively illustrate in side elevation the two end portions of a booster drive of the type shown in Fig. 1, with the reference characters A designating the extremities of said end portions which are associated with each other, Figures 6*a* and 6*b* collectively illustrate in top plan the two end portions shown in Figs. 5*a* and 5*b*, with the reference characters B designating the extremities which are associated with each other, Figure 7 is a perspective view, partly broken away, of a manifold and nozzle incorporated in the embodiments of the invention illustrated in Figs. 1 to 4, inclusive, Figure 8 is a longitudinal sectional view taken on line 8—8 of Fig. 6*a*, Figure 9 is a transverse sectional view taken on line 9—9 of Fig. 5*a*, Figure 10 is a detail, transverse sectional view taken on line 10—10 of Fig. 5*a*.

Figures 11A, 11B:
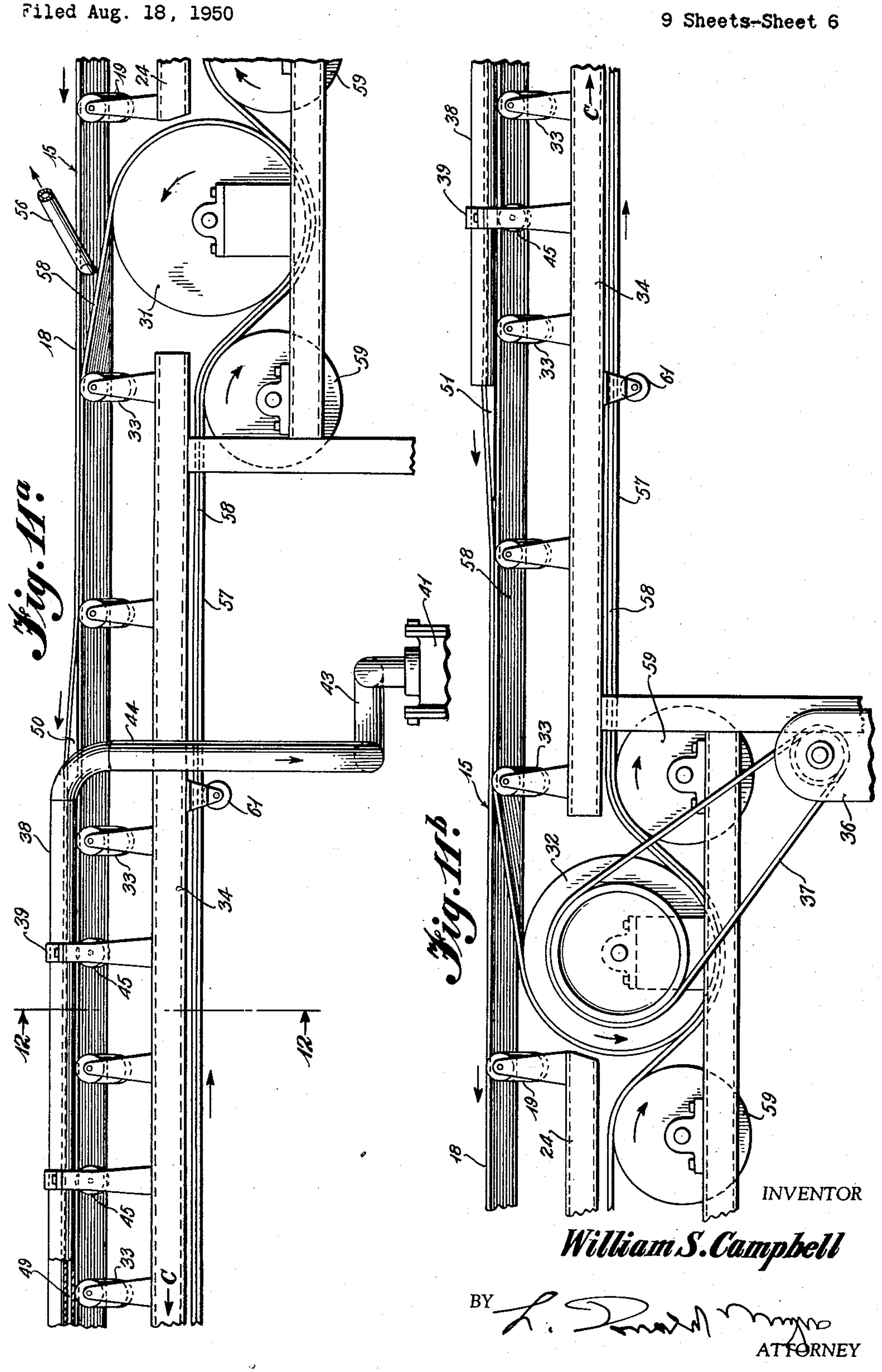
Figure 12:
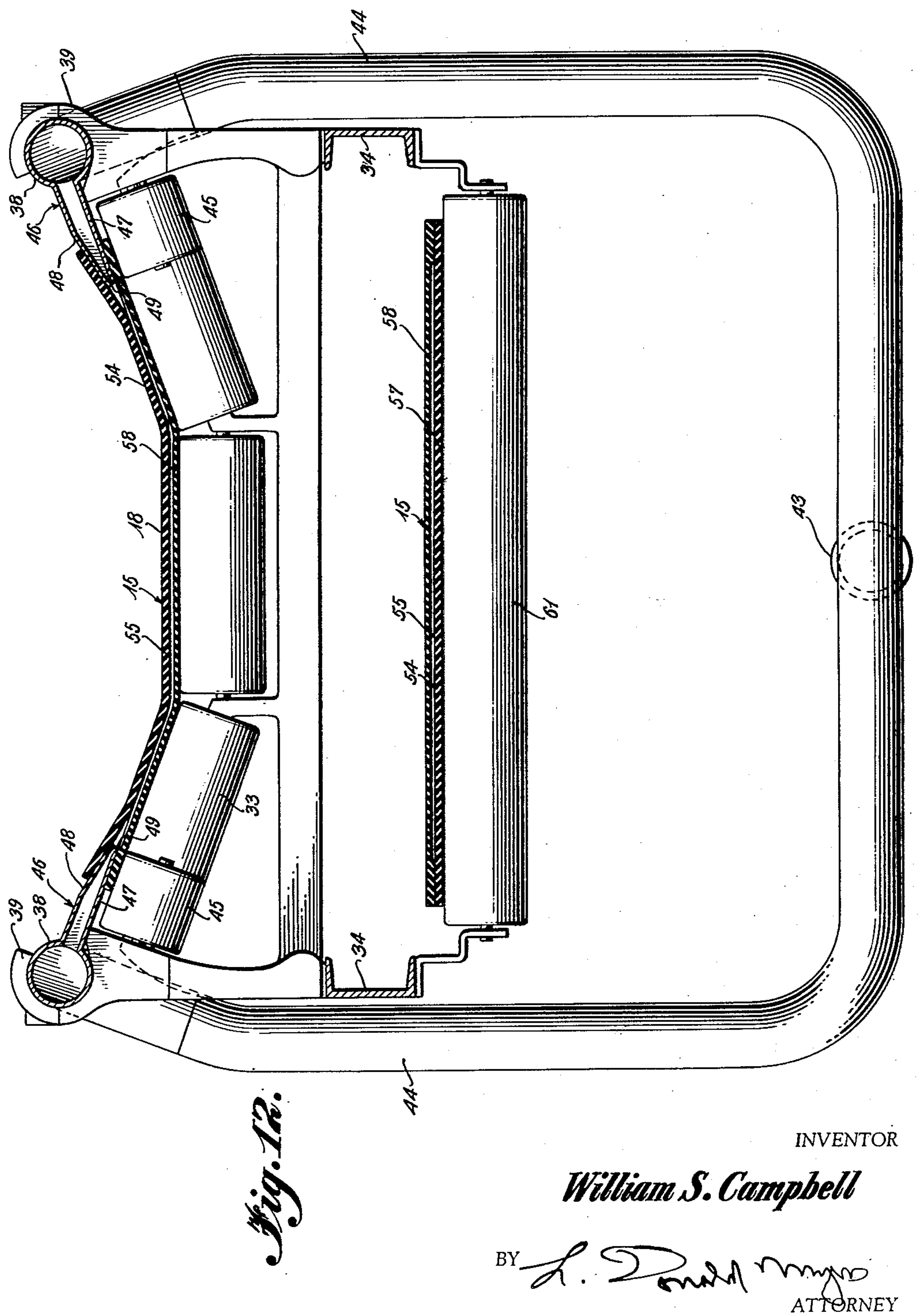
Figures 13A, 13B:
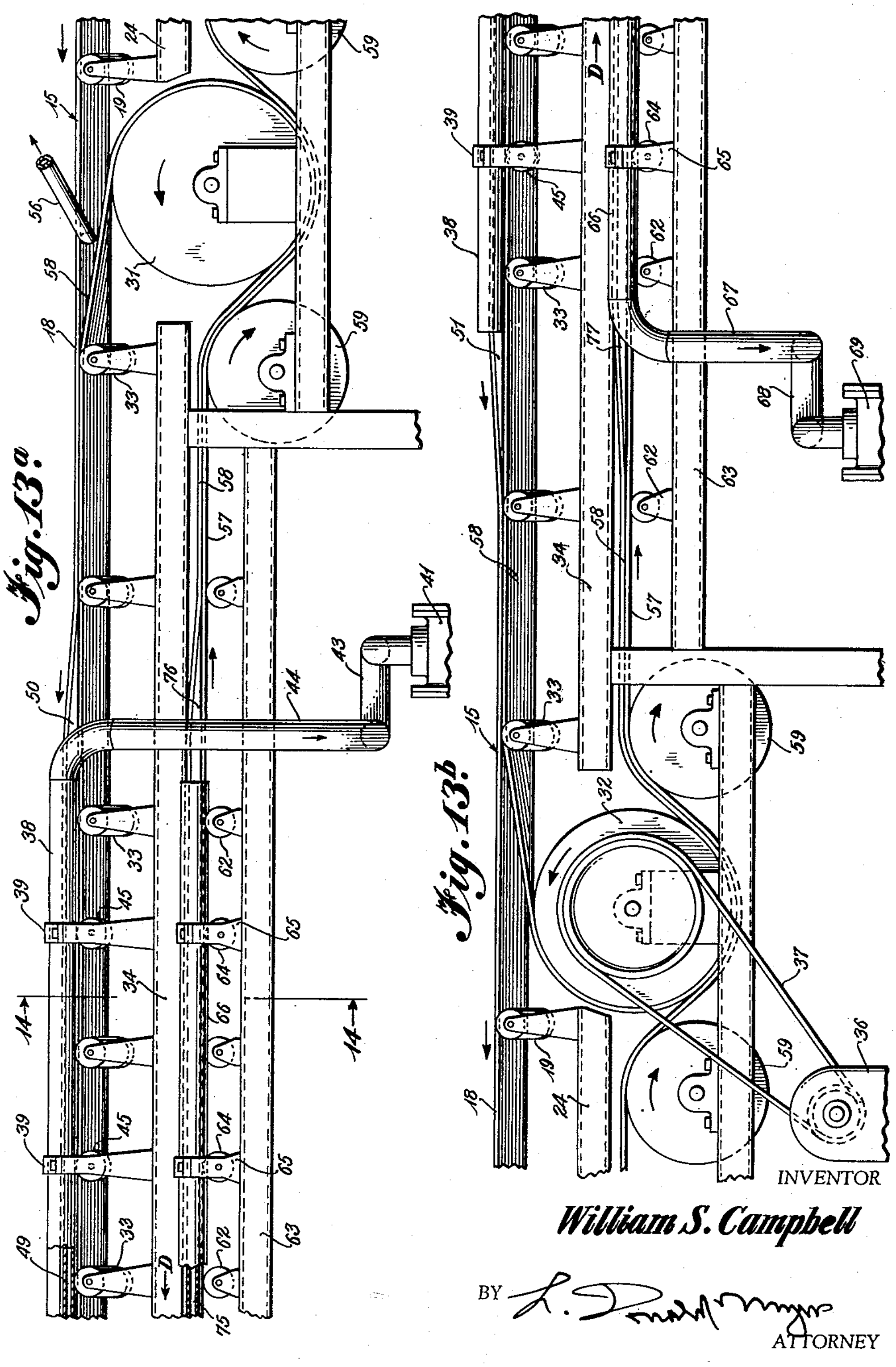
Figure 14:
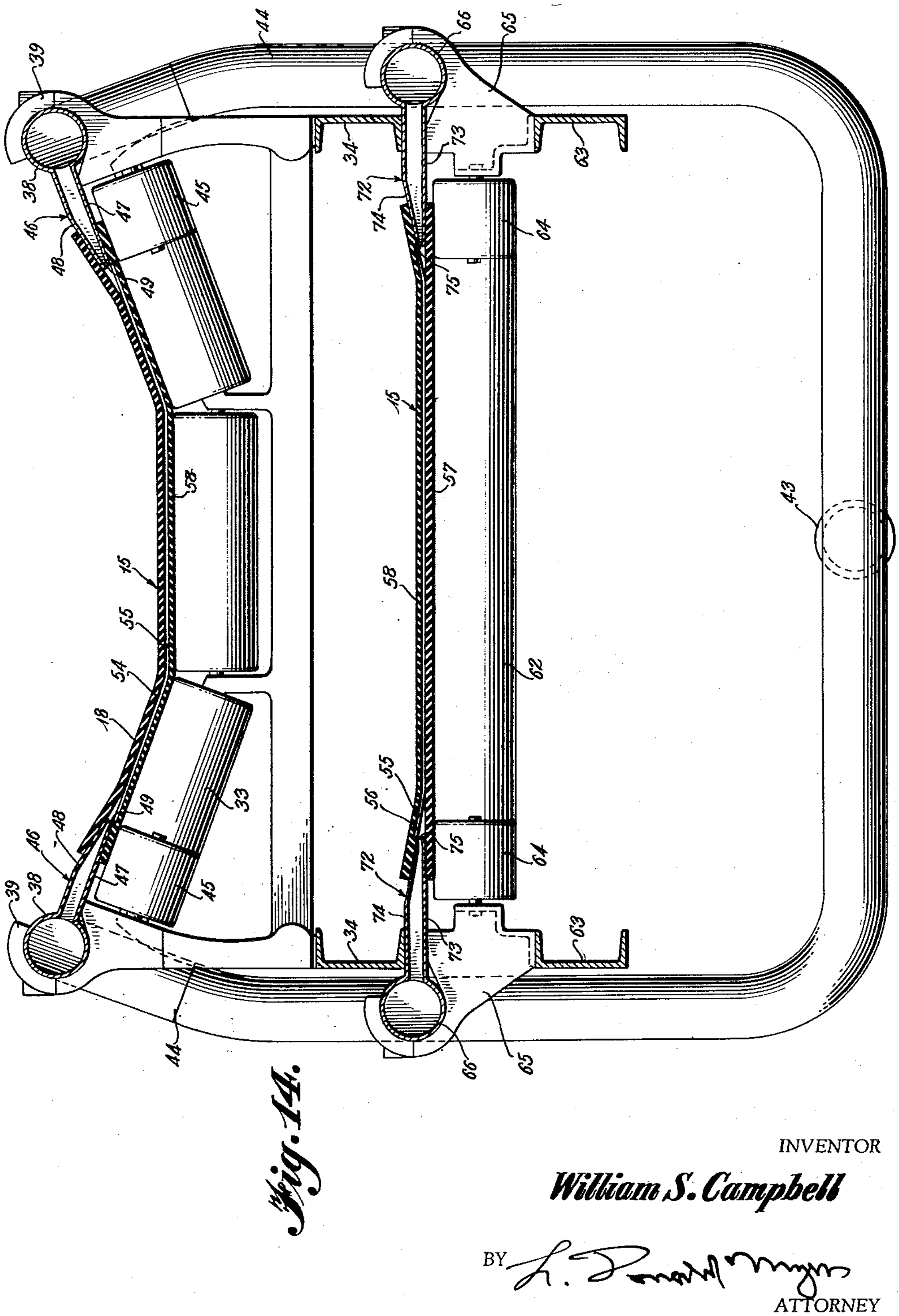

Figures 11$a$ and 11$b$ collectively illustrate in side elevation the two end portions of the booster drive of Fig. 3, with the reference characters C designating the extremities of said end portions which are associated with each other, Figure 12 is a transverse sectional view taken on line 12—12 of Fig. 11$a$, Figures 13$a$ and 13$b$ collectively illustrate in side elevation the two end portions of the booster drive of Fig. 4, with the reference characters D designating the extremities of said end portions which are associated with each other, and Figure 14 is a transverse sectional view taken on line 14—14 of Fig. 13$a$.

In the drawings, wherein for the purpose of illustration are shown the preferred embodiments of this invention, and first particularly referring to Fig. 1, reference character 15 designates an endless conveyor belt which is trained over a head pulley 16 and a tail pulley 17, in the conventional manner, to form an active run 18, supported by the idlers 19, and an inactive or return run 21, supported by the snubbing pulleys 22 and idlers 23. The supporting frame for the conveyor includes channel beams 24, or the like, at opposite sides of the same to which the various idlers are connected.

The head pulley 16 is driven by motor 25 through a speed reducer 26 and V-belts 27, or the like. Proper tension is maintained in the conveyor belt 15 by the weighted take-up device 28.

Referring now to Figs. 5$a$ to 10, inclusive, for a detail description of the booster drive unit of Fig. 1, an endless drive belt 29 is positioned between the active and return runs 18 and 21, respectively, of the conveyor belt and is trained over a pair of terminal pulleys 31 and 32 each of which is so dimensioned and arranged as to have its periphery adjacent the non-load carrying surface of the active run 18 and spaced from the return run 21 of the conveyor belt 15. Throughout most of the overall length of the drive belt 29, its upper run, as well as the active run 18 of the conveyor belt, are supported by the idlers 33 mounted on the channel beams 34 with the result that these two belts are in frictional driving engagement through these common portions of their respective runs. The lower run of the drive belt 29 is held in spaced relationship relative to the return run 21 of the conveyor belt 15 by the terminal pulleys 31 and 32 and any desired number of idlers, not shown.

The terminal pulley 32 at the head end of the drive belt 29 is driven by a motor 35 through a speed reducing unit 36 and V-belts 37, or the like, to impart movement to the drive belt.

A manifold 38 is mounted adjacent each edge of the engaging portions of the runs of the drive and conveyor belts 29 and 15, respectively, by the brackets 39 which are supported on the channel beams 34. An air pump 41, or other suitable exhausting device, driven by the motor 42, is placed in communication with the corresponding ends of the manifolds 38 by pipes 43 and 44. The opposite ends of the manifolds 38 are closed. The short idler rolls 45, mounted on the manifold supporting brackets 39, cooperate with the idlers 33 for maintaining the edge portions of the drive belt 29 in close engagement with the bottom surfaces of the manifold nozzles 46. Each of these nozzles 46 is in open communication with its manifold and extends therefrom into the space between the overlying edge portions of the drive and conveyor belts 29 and 15, respectively.

Referring now particularly to Figs. 7 to 10, inclusive, for a detail description of the nozzles 46 and their relationship to the other elements of the drive unit, the bottom 47 of each nozzle presents a smooth, unbroken contact surface spaced above the idlers 33 and the rolls 45 a distance substantially equal to the thickness of the drive belt 29. The opposite edge portions of the drive belt 29 are, therefore, held in sealing engagement with the bottom surfaces 47 of the nozzles while passing over the idlers 33 and rolls 45.

The top surface 48 of each nozzle 46 converges toward the bottom 47 to form a narrow, elongated opening 49. The opposite edge portions of the non-load carrying surface of the active conveyor belt run rest upon the top surfaces 48 of the nozzles to have sealing engagement therewith.

The ends of the two nozzles 46 extending toward the tail end of the conveyor are provided with tapered sealing sections 50 while the ends of the nozzles extending toward the head end of the conveyor are provided with tapered sealing sections 51. Each of the sealing sections 50 converges to a knife edge at 52 which serves to separate the runs of the approaching drive and conveyor belts 29 and 15, respectively, while maintaining sealing engagement therewith. The tapered sections 51 are provided with similar knife edges at 53 which permit the runs of the departing drive and conveyor belts 29 and 15, respectively, to gradually come together while maintaining sealing engagement therewith.

The driving surface 54 of the belt 29 is provided throughout its length with a multiplicity of longitudinally spaced, transversely extending grooves 55 which terminate at their opposite ends in spaced relation to the side edges of the belt, see Figs. 6$a$, 9 and 10, so as to leave a smooth contact area at each margin of the drive belt which is substantially equal to the portion of the width of the nozzle 46 that contacts the drive belt. These grooves 55, therefore, provide passageways between the engaging surfaces of the two belts 15 and 29 which extend between and are in open communication with the openings 49 of the two nozzles 46.

A nozzle 56 is shown in Figs. 5$a$, 6$a$ and 11$a$ as being positioned on each side of the conveyor adjacent the point at which the drive belt 29 moves into engagement with the conveyor belt 15. These nozzles 56 may take any desired form and are to be connected to a suction pump, not shown, so as to reduce the pressure which normally would build up between the converging surfaces of the two belts.

The operation of the belt conveyor and booster drive, as illustrated in Fig. 1, will be described as follows:

In this type of insulation, the primary power for driving the belt 15 is applied to the head pulley 16 by the motor 25. It will be assumed that the strength of the belt, due to such factors as its width, thickness and weight, is such that the power which can be applied by the head pulley is insufficient to drive the conveyor. It is necessary, therefore, to supply the required additional power by means of the booster drive belt 29.

It has been explained above how the exterior or outer grooved surface of the drive belt 29 is held in frictional engagement with the non-load carrying surface of the active run 18 of the conveyor belt. It will be appreciated that the mere frictional engagement of the two belt surfaces will permit the drive belt to apply a certain amount of power to the conveyor belt. The value of this normal power applying action, of course, will depend on the coefficient of friction of the engaging pair of belt surfaces and the combined weight of the active run of the conveyor belt and its load. Booster belt drives providing only the normal power applying action that results from mere frictional engagement of the two belt surfaces have been tried in the past but the amount of additional power that can be applied to the conveyor belt has not been of sufficient value to justify the cost of this type of installation.

With the present invention, the power applying action of the booster belt drive is increased in value to a very substantial extent by lowering the pressure of the air film that exists between the frictionally engaged surfaces of the drive and conveyor belts. This action results in creating a differential between the pressure of the air trapped between the engaged belt surfaces and the air of the surrounding atmosphere. Consequently, the atmospheric pressure, which has the higher value, will exert a uniform force against the exposed surfaces of the engaged portions of the two belts, and the load carried by the conveyor belt, with the result that the contacting surfaces of the belts will be pressed into much tigher engagement.

The decrease in the pressure of the air trapped between the engaged portions of the two belts 15 and 29 is effected by evacuating the air from the manifolds 38 by use of an air pump 41. This reduction in the pressure in the manifolds 38 will cause air to be withdrawn from between the belts 15 and 29 through the nozzles 46. Sealing engagement between the drive belt 29 and the bottoms 47 of the nozzles 46 and between the conveyor belt 15 and the top surfaces 48 of the nozzles will prevent leakage of air into the space between the belts and the relatively low pressure which prevails in the space between the belts will assist in maintaining these sealing engagements. The grooves 55 provide passageways for the uniform withdrawal of the air from between the drive and conveyor belts.

A thin layer of air adheres to and is carried by the conveyor and drive belts 15 and 29 adjacent their moving surfaces and, due to the convergence of the two belts, this air has a tendency to accumulate at a point just prior to the engagement of the belts. The nozzles 56, however, will remove a substantial portion of this accumulating air so that excessive pressures will not be built up between the engaging surfaces.

Referring now to Fig. 2, the belt conveyor and each one of the booster drives are identical to those illustrated in Fig. 1 and, for that reason, the same reference characters are used to designate like parts. Fig. 2 illustrates the use of a plurality of booster drives to supply the power necessary for satisfactory operation of the belt conveyor. It is to be understood, of course, that the number of booster drives employed may be varied to suit the requirements of any particular conveyor installation.

The modification illustrated in Figs. 3, 11*a*, 11*b* and 12 is identical to that illustrated in Fig. 1, with the single exception that a portion of the return run 57 of the conveyor belt 15 is supported in frictional engagement with the lower run of the drive belt 58. For this reason, like reference characters will be used to designate those parts of the device illustrated in Fig. 3 which are not modified with respect to form or location, and they will not be described again at this point.

Referring now to Figs. 11*a*, 11*b* and 12 for a detail description of the modification of Fig. 3, a pair of snubbing pulleys 59 engage the return run 57 of the conveyor belt 15 on the opposite sides of both of the terminal pulleys 31 and 32 of the drive belt 58. A plurality of idlers 61 are mounted on the channel beams 34 and depend therefrom for cooperation with the two pulleys 59 located between the terminal pulleys 31 and 32 to support both the associated portion of the return run 57 and the lower run of the drive belt 58 in close frictional engagement.

The snubbing pulley 59 located between the terminal pulleys 31 and 32 and adjacent the pulley 32 functions to increase the arc of contact between the drive belt and the terminal pulley 32 so that the power applying value of the frictional engagement between the pulley 32 and the drive belt is increased.

The operation of the modified form of the invention illustrated in Fig. 3 includes all of the advantages of the drive illustrated in Fig. 1 and adds thereto the advantage provided by the frictional drive engagement between the return run 57 of the conveyor belt and the lower run of the drive belt 58.

The modification illustrated in Figs. 4, 13*a*, 13*b* and 14 differs from the form of the invention illustrated in Fig. 3 in two respects. The first is the manner in which the engaged portions of the return run 57 of the conveyor belt and the lower run of the drive belt 58 are supported and the second is the provision of means for reducing the pressure of the air trapped between the engaged portions of both runs of the conveyor and booster drive belts. The same reference characters, therefore, will be applied to those parts which remain unchanged with regard to form or location.

A plurality of idlers 62 are mounted on channel beams 63 positioned on opposite sides of the conveyor and extend upwardly therefrom to support the engaged portions of the return run 57 of the conveyor belt and the lower run of the drive belt 58. Rolls 64 also are mounted on the channel beam 63 by means of brackets 65 and are uniformly spaced between idlers 62 to provide additional support for the edge portions of the drive and conveyor belts 58 and 15, respectively.

A manifold 66 is mounted in the brackets 65 on each side of the conveyor and adjacent the engaged portions of the return run 57 and the lower run of the drive belt 58. One end of each of the manifolds 66 is closed while their remaining ends are joined by the pipe 67 connected to pipe 68 which communicates with the inlet of the air pump 69 driven by the motor 71.

Each of the manifolds 66 is provided with a nozzle 72 extending into the space between the adjacent overlying edge portions of the drive belt 58 and the conveyor belt 15. The bottom 73 of each nozzle 72 presents a smooth, unbroken contact surface spaced from the idlers 62 and rolls 64, a distance substantially equal to the thickness of the conveyor belt 15. Both edge portions of the conveyor belt 15, therefore, are held in sealing engagement with the bottoms 73 of their associated nozzles 72, while passing over the idlers 62 and rolls 64.

The top surface 74 of each nozzle 72 converges toward the bottom 73 to form a narrow elongated opening 75 adjacent the conveyor belt 15. The edges of the drive belt 58 rest upon the top surfaces 74 in sealing engagement therewith so that the grooves 55 in the driving surface 56 of the drive belt 58 are in open communication with the openings 75 of the nozzles.

The ends of the nozzles 72 toward the tail end of the conveyor are provided with tapered sealing portions 76 and the ends of the nozzles toward the head end of the conveyor are provided with tapered sealing portions 77 which function in the same manner as the end portions 50 and 51 of the previously described nozzles 46.

The operation of the modification of Fig. 4 is similar to that of the modifications illustrated in Figs. 1 and 3, except that the power applying action of the frictional engagement between the drive belt 58 and conveyor belt 15 is increased to the greatest value possible.

It is to be understood that the forms of this invention herewith shown and described are to be taken as the preferred examples of the same and that various changes in the shape, size, and arrangement of parts may be resorted to without departing from the spirit of the invention or the scope of the subjoined claims.

Having thus described the invention, I claim:

1. In a belt conveyor drive, the combination with a conveyor belt, of a drive belt, means including a pair of terminal pulleys for supporting said drive belt with one of its runs in frictional engagement with one run of the conveyor belt for applying power to the latter belt, means for driving one of said terminal pulleys, nozzle means entering between the longitudinal edge portions of said belts, and means connected to said nozzle means for exhausting air therethrough to reduce the pressure of the air trapped between the engaging surfaces of said belts to increase the power applying value of the frictional engagement between said belts.

2. In a belt conveyor drive, the combination with a conveyor belt, of a drive belt, means including a pair of terminal pulleys for supporting said drive belt with a portion thereof in frictional engagement with a portion of the conveyor belt for applying power to the latter belt, means for driving one of said terminal pulleys, nozzle means entering between the longitudinal edge portions of said belts, a manifold in communication with said nozzle means, and means for exhausting air through said manifold to reduce the pressure of the air trapped between the engaging surfaces of said belts to increase the power applying value of the frictional engagement between said belts.

3. In a belt conveyor drive, the combination with a conveyor belt, of an endless drive belt, a pair of terminal pulleys for said drive belt, means for driving one of said terminal pulleys, a plurality of idler rolls engaging said drive belt for holding the latter in frictional engagement with a portion of the non-load carrying surface of said conveyor belt to apply power to the latter, stationary nozzle means projecting between said drive and conveyor belts, and means for exhausting air through said nozzle means to reduce the pressure of the air trapped between the engaging surfaces of said belts to a point below that of the surrounding atmosphere to increase the power applying value of the frictional engagement between said belts.

4. In a belt conveyor drive, the combination with a conveyor belt, of an endless drive belt having an outer driving surface, a pair of terminal pulleys for said drive belt, a motor for driving one of said pulleys, a plurality of idler rolls supporting a portion of the driving surface of said drive belt and a portion of the conveyor belt in overlying relationship for frictional engagement therebetween to apply power to the conveyor belt, stationary nozzle means projecting between the said overlying longitudinal edge portions of said belts, and means for exhausting air through said nozzle means to reduce the pressure of the air trapped between the engaging surfaces of said belts to a point below that of the surrounding atmosphere to increase the power applying value of the said frictional engagement.

5. In a belt conveyor drive, the combination with a conveyor belt, of an endless drive belt having an outer driving surface, a pair of terminal pulleys for said drive belt, means for driving one of said pulleys, a plurality of idler rolls supporting a portion of the driving surface of said drive belt and a portion of the conveyor belt in overlying relationship for frictional engagement therebetween to apply power to the conveyor belt, a stationary manifold, nozzle means in communication with said manifold and projecting between the overlying longitudinal edges of said belts, and means for exhausting air through said manifold to reduce the pressure of the air trapped between the engaging surfaces of said belts to a point below that of the surrounding atmosphere to increase the power applying value of the said frictional engagement.

6. In a belt conveyor drive, the combination with a conveyor belt, of an endless drive belt having an outer driving surface provided throughout its length with a plurality of spaced transverse grooves extending between points adjacent the longitudinal edges of the belt, a pair of terminal pulleys for said drive belt, means for driving one of said pulleys, a plurality of idler rolls supporting a portion of the driving surface of said drive belt and a portion of the conveyor belt in overlying relationship for frictional engagement therebetween for applying power to the conveyor belt, a stationary manifold, nozzle means connected to said manifold and having a narrow elongated outer opening, said nozzle means projecting between the overlying longitudinal edges of said belts and having its outer opening in communication with the grooves of said driving surface, and means for exhausting air through said manifold and nozzle means to reduce the pressure of the air trapped between the engaging surfaces of said belts to a point below that of the surrounding atmosphere to increase the power applying value of the frictional engagement of said belts.

7. In a belt conveyor drive, the combination with a conveyor belt, of an endless drive belt having an outer driving surface provided throughout its length with longitudinally spaced, transverse grooves terminating short of the longitudinal edges of the belt, means for driving the drive belt, means for supporting a portion of the driving surface of said drive belt and a portion of the conveyor belt in overlying relationship for frictional engagement therebetween to apply power to the conveyor belt, a stationary manifold paralleling the edges of the frictionally engaged portions of said belts, a nozzle connected to said manifold and extending between the overlying edges of said belts, the top and bottom surfaces of said nozzle converging to form an elongated outer opening between longitudinally tapered sealing sections at the opposite ends of said nozzle adapted to have sealing engagement with the overlying edges of the moving belts as they separate in approaching the nozzle and converge upon passing the nozzle, and exhaust means in communication with said manifold for removing air trapped between the engaging portions of said belts, including said driving surface grooves, to reduce its pressure to a point below that of the surrounding atmosphere to increase the power applying value of the frictional engagement between said belts.

8. In a belt conveyor drive, the combination with a conveyor belt, head and tail pulleys for said conveyor belt, and means for driving one of said pulleys, of a drive belt, a pair of terminal pulleys for said drive belt, means for driving one of said terminal pulleys, idler rolls supporting said drive belt in frictional engagement with a non-load carrying surface of said conveyor belt intermediate said head and tail pulleys to apply additional power to the conveyor belt, stationary nozzle means projecting between the engaged portions of said drive and conveyor belts, and means for exhausting air from said nozzle means to reduce the pressure of the air trapped between the engaging surfaces of said belts to a point below that of the surrounding atmosphere to increase the power applying value of the frictional engagement between said belts.

9. In a belt conveyor drive, the combination with a conveyor belt, head and tail pulleys for said conveyor belt, and means for driving one of said pulleys, of a plurality of drive belts, a pair of terminal pulleys for each of said drive belts, means for driving one of the terminal pulleys of each of said pairs, a plurality of idler rolls engaging each of said drive belts for holding the latter in frictional engagement with the non-load carrying surface of said conveyor belt intermediate its head and tail pulleys to apply additional power to the conveyor belt, stationary nozzle means projecting between the engaged portions of said drive and conveyor belts, and means for exhausting air from said nozzle means to reduce the pressure of the air trapped between the engaging surfaces of said belts to a point below that of the surrounding atmosphere to increase the power applying value of the frictional engagement between said belts.

10. In a belt conveyor drive, the combination with an endless conveyor belt, of an endless drive belt positioned within the path formed by and having an outer driving surface facing the inner surface of the conveyor belt, a pair of terminal pulleys for said drive belt, means for driving one of said pulleys, idler rolls supporting said drive and conveyor belts through portions of their respective runs in frictional engagement for applying power to the conveyor belt, a stationary manifold on each side of said belts extending along the engaged portions of their respective runs, a nozzle connected to each manifold and projecting between and in contact with the adjacent overlying edges of said belts, and means for exhausting the air from said manifolds to reduce the pressure of the air trapped between the engaging surfaces of said belts to a point below that of the surrounding atmosphere to increase the power applying value of the frictional engagement between said belts.

11. In a belt conveyor drive, the combination with a conveyor belt having an active run and a return run, of a drive belt, means including a pair of terminal pulleys for supporting said drive belt with one of its runs in frictional engagement with the active run and its other run in spaced relationship to the return run of said conveyor belt so as to apply power only to the active run of said conveyor belt, nozzle means entering between the engaging surfaces of said belts, and means for exhausting air through said nozzle means to reduce the pressure of the air trapped between the engaging surfaces of said belts to increase the power applying value of the frictional engagement between said belts.

12. In a belt conveyor drive, the combination with a conveyor belt having a load carrying run and a return run, of an endless drive belt having a driving run and a return run, means for imparting movement to said drive belt, a plurality of idler rolls for supporting the driving run of said drive belt in frictional engagement with the load carrying run of said conveyor belt for applying power thereto, the return runs of said belts being spaced to provide clearance therebetween, stationary nozzle means projecting between the load carrying run of said drive belt and the active run of said conveyor belt, and means for exhausting air through said nozzle means to reduce the pressure of the air trapped between the engaging surfaces of said belts to a point below that of the surrounding atmosphere to increase the power applying value of the frictional engagement between said belts.

13. In a belt conveyor drive, the combination with a conveyor belt having a load carrying run and a return run, of a drive belt having a driving run and a return run, means for imparting movement to said drive belt, means for supporting portions of both runs of both of the belts in frictional engagement so as to apply power to both the load carrying and return runs of said conveyor belt, nozzle means projecting between the engaging portions of said drive belt and the active run of said conveyor belt, and means for exhausting air through said nozzle means to reduce the pressure of the air trapped between the drive belt and the active run of said conveyor belt to increase the power applying value of the frictional engagement therebetween.

14. In a belt conveyor drive, the combination with a conveyor belt having a load carrying run and a return run, of a drive belt having a driving run and a return run, means for imparting movement to said drive belt, means for supporting portions of both runs of both of the belts in frictional engagement so as to apply power to both the load carrying and return runs of said conveyor belt, nozzle means projecting between the engaging portions of said drive belt and the active and return runs of said conveyor belt, and means for exhausting air through said nozzle means to reduce the pressure of the air trapped between the engaging portions of said drive belt and the active and return runs of said conveyor belt to increase the power applying value of the frictional engagement therebetween.

15. In a belt conveyor drive, a transversely flexible conveyor belt having a load carrying run, a drive belt having a run in frictional driving engagement with the aforesaid run of the conveyor belt, said drive belt being at least as flexible transversely as said conveyor belt to permit the engaged portions of said drive and conveyor belts to at all times conform in cross-sectional contour, pulley means for applying power to the drive belt, and means in communication solely with the space between the portions of said belts in driving engagement for exhausting air only from said space to increase the power applying value of their frictional engagement.

16. In a belt conveyor drive, a transversely flexible conveyor belt having a troughed load carrying run and a flat return run, pulley means for applying power to said belt, a transversely flexible drive belt having a troughed run in frictional driving engagement with the troughed run of the conveyor belt and a flat return run spaced from the return run of the conveyor belt, pulley means for applying power to the drive belt, and means in communication solely with the space between the portions of said belts in driving engagement for exhausting air only from said space to increase the power applying value of their frictional engagement.

17. In a belt conveyor drive, a conveyor belt having a troughed load carrying run and a flat return run, a drive belt having a troughed run and a flat run in frictional driving engagement with the load carrying and return runs, respectively, of the conveyor belt, pulley means for applying power to the drive belt, and means in communication solely with the space between the portions of the load carrying run of the conveyor belt and the associated driving run of the drive belt which are in driving engagement for exhausting air only from air space to increase the power applying value of their frictional engagement.

18. In a belt conveyor drive, a conveyor belt having a troughed load carrying run and a flat return run, pulley means for applying power to said belt, a drive belt having a troughed run in frictional driving engagement with the troughed load carrying run of the conveyor belt and a flat return run in frictional driving engagement with the return run of the conveyor belt, pulley means for applying power to the drive belt, and means in communication solely with the space between the portions of the aforesaid conveyor and drive belts in driving engagement for exhausting air only from said space between the engaged portions of the aforesaid conveyor and drive belts to increase the power applying value of their frictional engagement.

19. In a belt conveyor drive, a conveyor belt formed of impervious material and having a non-load carrying surface, a drive belt formed of impervious material and having a driving surface in frictional engagement with said non-load carrying surface, means for applying power to said drive belt, and means dependent on the impervious character of said belts for increasing the power applying value of said frictional engagement.

20. In a belt conveyor drive, a conveyor belt formed of material impervious to the passage of air and having a non-load carrying surface, a drive belt formed of material impervious to the passage of air and having a driving surface in frictional engagement with said non-load carrying surface, means for applying power to said drive belt, and means for exhausting air solely from between said non-load carrying conveyor belt and drive belt surfaces to increase the power applying value of their frictional engagement.

References Cited in the file of this patent

UNITED STATES PATENTS

| Number | Name | Date |
|---|---|---|
| 566,637 | Wallis | Aug. 25, 1896 |
| 1,514,011 | Pope | Nov. 4, 1924 |
| 1,626,041 | Kyle et al. | Apr. 26, 1927 |
| 1,635,363 | Handley et al. | July 12, 1927 |
| 2,522,115 | Harper | Sept. 12, 1950 |
| 2,650,695 | Robins | Sept. 1, 1953 |

FOREIGN PATENTS

| Number | Country | Date |
|---|---|---|
| 702,118 | Germany | Jan. 30, 1941 |